United States Patent
Zander et al.

(10) Patent No.: US 10,940,770 B2
(45) Date of Patent: Mar. 9, 2021

(54) LIGHTING CONCEPT FOR A CHARGING PARK

(71) Applicant: Dr. Ing. h.c. F. Porsche Aktiengesellschaft, Stuttgart (DE)

(72) Inventors: Steve Zander, Marbach am Neckar (DE); Timo Kaul, Bietigheim-Bissingen (DE); Raoul Heyne, Wiernsheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 4 days.

(21) Appl. No.: 16/454,440

(22) Filed: Jun. 27, 2019

(65) Prior Publication Data
US 2020/0001737 A1    Jan. 2, 2020

(30) Foreign Application Priority Data
Jun. 29, 2018   (DE) .................... DE102018115797.5

(51) Int. Cl.
| | |
|---|---|
| *B60L 53/68* | (2019.01) |
| *B60L 53/67* | (2019.01) |
| *H05B 47/11* | (2020.01) |
| *B60L 53/302* | (2019.01) |
| *B60L 53/30* | (2019.01) |
| *B60L 53/14* | (2019.01) |

(52) U.S. Cl.
CPC ............ *B60L 53/68* (2019.02); *B60L 53/302* (2019.02); *B60L 53/305* (2019.02); *B60L 53/67* (2019.02); *H05B 47/11* (2020.01); *B60L 53/14* (2019.02); *B60Y 2200/91* (2013.01); *B60Y 2300/91* (2013.01)

(58) Field of Classification Search
CPC .......... B60L 53/14; B60L 53/67; B60L 53/68; B60L 53/302; B60L 53/305; B60Y 2200/91; B60Y 2300/91; H05B 47/11
USPC .................................................. 307/31, 117
See application file for complete search history.

(56) References Cited

U.S. PATENT DOCUMENTS

| | | | |
|---|---|---|---|
| 9,718,341 B1 | 8/2017 | Antrobus et al. | |
| 9,860,952 B2 * | 1/2018 | Twaddell | ............... H05B 31/50 |
| 2010/0230193 A1 | 9/2010 | Grider et al. | |
| 2011/0145141 A1 | 6/2011 | Blain | |
| 2012/0086360 A1 | 4/2012 | Weng | |
| 2013/0013091 A1 | 1/2013 | Cavalcanti et al. | |
| 2013/0015783 A1 | 1/2013 | Herbst | |
| 2015/0346697 A1 | 12/2015 | Mailloux et al. | |
| 2016/0016663 A1 | 1/2016 | Stanek et al. | |

FOREIGN PATENT DOCUMENTS

| | | |
|---|---|---|
| CN | 106849316 A | 6/2017 |
| WO | 2011163623 A1 | 12/2011 |

* cited by examiner

*Primary Examiner* — Hal Kaplan
(74) *Attorney, Agent, or Firm* — RatnerPrestia

(57) ABSTRACT

A method for operating a charging system for charging electric vehicles, wherein the charging system has a charging station and at least two charging columns which are physically separate from one another and each have at least one charging connection. Each charging column has a light sensor and also a light and/or a display. The method includes receiving signals of the individual light sensors and also collectively evaluating the signals and adjusting the brightness of the light and/or the display of at least one of the charging columns depending on a result of collectively evaluating the received signals. Also described herein is a corresponding charging system.

11 Claims, 1 Drawing Sheet

LIGHTING CONCEPT FOR A CHARGING PARK

CROSS-REFERENCE TO RELATED APPLICATION

This application claims priority to German Patent Application No. DE 10 2018 115 797.5, filed Jun. 29, 2018, which is incorporated by reference herein in its entirety.

FIELD OF THE INVENTION

The present invention relates, in general, to a lighting concept for a charging park, in particular to a method for controlling lighting and/or display means on charging columns of the charging park, which method depends on the ambient brightness.

BACKGROUND OF THE INVENTION

Nowadays, charging columns for charging electric vehicles are often installed sporadically, especially since there is usually no power grid connection which allows a plurality of charging columns to be installed in one place. These sporadically installed charging columns are individually operated and are not understood to be a charging park. However, as the number of electric vehicles increases, the demands made on the charging infrastructure also increase. In the manner of existing filling stations which can have a large handling capacity depending on the number of filling columns, charging parks are constructed in an analogous manner and have a plurality of charging spaces at which electric vehicles can be charged. A charging park usually has, in addition to the required structural devices, a plurality of charging columns, a cooling unit and a power electronics system. The cooling unit together with the power electronics system can be centrally positioned in a charging station which is coupled to the individual charging columns.

It is desirable for the charging processes to function smoothly for the users of the charging park. Firstly, the user interfaces, HMI (Human Machine Interfaces) for short, which are attached to the charging columns in the form of touch-sensitive displays or screens for example, should always be easily readable for this purpose. To this end, the illumination level of the displays can be matched to the brightness of the surroundings, so that they are relatively intensely illuminated during the day, for example in the case of direct solar radiation, and are illuminated relatively weakly at night. A light sensor which is attached to the charging column is usually used for actuating the display of a charging column in a manner adjusted to the brightness. The adjustment, which is controlled by ambient light, of the illumination level of a display assumes a functioning light sensor. Therefore, it is desirable for defective, damaged or blocked light sensors to be identified as quickly as possible and for corresponding maintenance measures to be initiated. Similarly, optimum control, which is adjusted to the brightness of the surroundings, of the lighting means (for example lamps or other illumination arrangements) likewise constitutes a factor which can improve charging convenience, in particular at night.

Document US 2010/230193 A, which is incorporated by reference herein, discloses an electric vehicle comprising a screen, which is connected to the charging system, for displaying charging information, wherein the brightness of the screen can be set on the basis of the detected ambient light level. Document CN 106849316 A, which is incorporated by reference herein, describes a charging station for an electric vehicle comprising a screen, wherein the ambient light intensity is detected. Documents US 2016/0016663, U.S. Pat. No. 9,718,341 B and WO 11/163623 A1, each of which are incorporated by reference herein, likewise disclose charging stations for an electric vehicle comprising a screen on which the brightness can be adjusted.

SUMMARY OF THE INVENTION

Described herein is a lighting concept for a charging park, in which the illumination level of the displays and/or lighting means used can be set both in accordance with requirements and also in a fail-safe and fault-proof manner.

The invention provides a method for operating a charging system for charging electric vehicles, wherein the charging system has a charging station and at least two charging columns which are physically separate from one another and each have at least one charging connection, wherein each charging column has a light sensor and also a lighting means and/or a display means. The method comprises receiving signals of the individual light sensors, wherein each received signal indicates a brightness value which is ascertained by the corresponding light sensor, collectively evaluating the received signals, and adjusting the brightness of the lighting means and/or of the display means of at least one of the charging columns depending on a result of collectively evaluating the received signals.

In existing charging parks, it is not known for the data which is provided by sensors of the charging columns to be collectively evaluated and assessed. That is to say for lighting means and the brightness of the display of a charging column to be individually controlled on the basis of signals/data which are/is provided by the light sensor of the associated charging column. In contrast to this, the idea on which the invention is based is that the charging stations of a charging park are considered in respect of the prevailing light conditions collectively with the other charging columns, that is to say as a combination altogether. Consequently, the signals/data of the light sensors, preferably of all charging columns of the charging park, are evaluated together and collectively (for example compared), that is to say for example with the inclusion of all involved charging columns of the charging park. Based on a result of this collective comparison, the brightness or illumination level of the displays and/or of the lighting means of each individual charging column can then be adjusted individually or collectively. When collectively evaluating the received signals of the light sensors, it is not necessary to take into account all charging columns of the charging park. Evaluating the received signals of the light sensors can be limited to any desired subgroup of light sensors and therefore any desired subgroup of charging columns of the charging park. Even though a charging column usually has one light sensor, in further embodiments a charging column can, however, also have more than one light sensor, each of which is oriented in a different direction (for example area in front of the charging column and area behind the charging column) for example. In any case, information which can be used for actuating the displays and/or the lighting means of the charging columns as desired or in a manner matched to the ambient brightness can be obtained from the result of collectively evaluating the signals of the light sensors. In the event of the sensor data of all charging columns not being used for the collective evaluation, the corresponding subgroups of the charging columns can be understood as a representative group of charging columns. Based on the evaluation of the signals/data of this representative subgroup of light sensors, the ambient light conditions at the site of the charging station can be ascertained and the displays and/or lighting means of all charging columns can be actuated in an optimum manner in respect of their brightness or illumination level. In particular, disadvantages due to location of individual charging columns within the charging column ensemble can be identified and taken into account when actuating the displays and/or lighting means. In addition, collectively evaluating the sensor data of the charging columns can lead to further findings about the installed charging park.

The charging system according to aspects of the invention may be a charging park which substantially comprises a charging station and a number of charging columns which function as independent charging points and are usually arranged physically separate from one another, for example are arranged in parking bays which are arranged next to one another. The charging station can have a cooling unit and also the power electronics system. The power electronics system controls the current conversion (current intensity, voltage and possibly type of current (DC or AC)) between current source (for example power grid connection of the charging station and/or buffer storage device) and the charging columns. As an alternative, the current conversion can be decentralized in the charging system according to aspects of the invention, so that each charging column comprises the power electronics system required for providing charging current. Embodiments in which the current conversion takes place in two stages and both the charging station and also the charging columns each comprise a power electronics system, so that the current conversion takes place in two stages overall, are also conceivable.

Each charging column can have at least one light sensor which can detect the brightness of the surroundings. The detected ambient brightness level can be transmitted, for example by means of a signal which is proportional to it, from the light sensor to a central computer unit in the charging station for evaluation purposes. The brightness of the lighting means and/or of the display means of each charging column can be set on the basis of the ascertained brightness or the ascertained brightness pattern (for example brightness distribution in the region of the charging station, as ascertained from the individual sensor data). The lighting means of the charging column can have any desired arrangement of lamps/lights and can serve to illuminate the charging column, so that said charging column can, for example, be used without problems at night too.

According to further exemplary embodiment, collectively evaluating the received signals can comprise comparing the received signals with one another. Comparison of the signals which are received by the light sensors can be used, for example, to ascertain whether all sensors provide the same or a similar signal. In particular, a comparison of this kind can take place at night in order to eliminate interfering and locally variable light influences (for example due to the sun or due to shadows caused by objects). If, for example, a light sensor provides a signal which is different from all other light sensors, this can mean that said light sensor is defective. Comparing the signals provided by the light sensors may be expedient, in particular, when deviations which are not plausible have already been identified during the day. Deviations can be classified as not plausible if, for example, they do not correlate with the daily fluctuation in the ambient brightness or cannot be explained by physical conditions at the site of the charging columns. If, for example, a charging column is in the shade of a building (for example a canopy) or a tree, it can be expected that the associated light sensor will report a relatively lower brightness. A deviation, which is correspondingly established during the day, in the light sensor signal from the other light sensor signals, of which the charging columns are not in the shade, is then classified as plausible.

Furthermore, comparisons of the items of sensor data with one another and/or comparisons of items of data of a sensor (for example of a sensor which is suspected of not functioning correctly) given different weather conditions and/or times of day and therefore given different brightness levels of the surroundings can be performed. By virtue of comparison given different brightness levels, it is not only possible to ascertain defective light sensors but it is also possible to check for correct functioning of the light sensors (for example by comparing the brightness differences of the light sensors during different weather conditions). Therefore, according to further exemplary embodiments, the method can, overall, further comprise establishing an incorrectly functioning light sensor on the basis of the result of collectively evaluating the received signals.

According to further exemplary embodiments, the method can further comprise sending a servicing request to a service center in the event that the presence of an incorrectly functioning light sensor is established. The presence of an incorrectly functioning light sensor can manifest itself, for example, in a permanent and implausible deviation in the signal of the light sensor from the signals of the other light sensors. In general, the development of the signal of a sensor over time can also be examined and, for example, compared with those of the other light sensors in order to reinforce or to disprove the suspicion that said light sensor is functioning incorrectly. If, for example, the signal of a light sensor is permanently severely damped in comparison to the signals of the other light sensors during the day and/or different weather conditions and this damping is implausible, the light sensor can be classified as defective. In general, a light sensor can be defective, damaged or blocked. A sensor can be blocked, for example, by chewing gum, a sticker or graffiti. Within the scope of this description, a defective sensor is intended to cover at least all three cases.

According to further exemplary embodiments of the method, collective evaluation of the received signals can comprise ascertaining a mean value of the received signals. By virtue of comparing a signal of a light sensor with the mean value of all signals considered (that is to say mean value of all other signals or of a subgroup of the other signals), the deviation in the signal of each of the light sensors from the mean value can firstly be ascertained. Defective light sensors can ultimately be ascertained from said comparison. Secondly, conclusions about the prevailing brightness in the surroundings of the charging park and therefore, for example, about night time or heavy cloud cover (for example in conjunction with a time of day comparison), can be drawn from the mean value of the received signals.

According to further exemplary embodiments of the method, establishing an incorrectly functioning light sensor can be performed when the mean value of the received light sensor signals lies below a predetermined threshold value. In other words, the comparison of the sensor data directed at establishing a defective light sensor can take place only when the mean value lies below a predetermined threshold value. As a result, the decision as to whether a sensor is defective is limited to cases of low brightness of the surroundings, that is to say during the night time or at times of heavy cloud cover for example. If evaluation of the signals of the light sensors is then performed, the interfering influence of (excessively) bright surroundings of the charging columns can be minimized. As a result, the reliability of detecting defective light sensors can be increased.

If a light sensor has been classified as defective, its provided signals, if they are even provided at all, are unusable and, respectively, depict the brightness of the surroundings incorrectly. According to further exemplary embodiments, an ascertained mean value of the signals of the other light sensors can be assumed to be a signal which is transmitted by the incorrectly functioning sensor in a case such as this. As an alternative, the brightness signal which is provided by an adjacent charging column or a mean value of the brightness values of adjacent charging columns can be assumed to be the signal which is transmitted by the incorrectly functioning light sensor. This ensures a high degree of availability of each individual charging column—even in cases in which the light sensor is defective and consequently it is not possible to actuate the display and/or the lighting means depending on the brightness of the area surrounding the charging column in question.

According to further exemplary embodiments of the method, collectively evaluating the received signals comprises ascertaining a deviation in the signal of a determined light sensor from the mean value of the other received signals. The degree of the deviation can be checked for plausibility. Furthermore, given a relatively high mean value which indicates bright surroundings, for example sunny weather, direct solar irradiation of a charging column can be established or estimated from the degree of said deviation. In addition, sunny weather can be derived from the local weather data, additionally in conjunction with collectively evaluating the data of the light sensors. If, for example, the sensor signal of a non-defective light sensor deviates upward to a great extent from the collective mean value during the day (that is to say it exhibits a very high degree of brightness) while the other light sensors likewise exhibit a high degree of brightness, it can be assumed from this that the charging column which is associated with the light sensor is exposed to direct sunlight. Detecting an event of this kind can be relevant for cooling the charging columns since a charging column which is exposed to direct solar irradiation, in particular a charging cable which is exposed to direct solar irradiation, heats up more quickly According to further exemplary embodiments, the method can further comprise ascertaining a temperature of the charging columns, preferably of the charging connection cable of the charging columns, and comparing the ascertained temperatures of the charging columns with the ascertained brightness values of the charging columns. Comparing these two values can be understood to mean relating said two values to one another or examining said two values for correlation, that is to say, for example, checking for plausibility between a high brightness value and a high temperature. The temperature can be ascertained by means of suitable temperature sensors, for example by means of a thermocouple. By relating the ascertained temperature to the reported brightness value of a light sensor of a charging column, the assumption that said charging column is exposed to direct solar radiation can be confirmed or denied.

According to further exemplary embodiments, the method can further comprise controlling a cooling circuit of the charging station depending on the result of the comparison of the ascertained temperatures of the charging columns with the ascertained brightness values of the charging columns. In other words, on the basis of solar irradiation of a charging column, in particular of the charging cable of the charging column, which solar radiation is ascertained by brightness and preferably verified by temperature measurement, a cooling circuit can be actuated in such a way that the cooling capacity at the charging column in question is increased. Excessive heating of the charging column, which can cause a malfunction, can thereby be avoided.

Overall, efficient fault identification can take place by comparing the signals or data of a light sensor with the results which are obtained from collectively evaluating the signals or data of all or at least a group of the majority of light sensors (with or without the inclusion of the light sensor under consideration, of which the signals or data are/is compared) and a higher degree of fail-safety can be achieved by compensating for the missing/incorrect signals or data at the same time. In general, non-optimum or even faulty actuation of a display and/or of a lighting means on the basis of false brightness information of a defective light sensor can be avoided by comparing the measurement values of the light sensors with results of collectively evaluating the measurement values of the other light sensors (for example a mean value).

Further exemplary embodiments provide a charging system for charging electric vehicles, comprising a charging station and at least two charging columns which are physically separate from one another and each have at least one charging connection, wherein each charging column has a light sensor and also a lighting means and/or a display means. The charging station has a control unit which is coupled to the light sensors of the charging columns and is designed to execute the method described above in this document. In particular, the control unit can be designed to transmit signals for setting the brightness of the displays and/or of the lighting means of the charging columns to said displays and/or lighting means.

Further advantages and refinements of the invention can be found in the description and the accompanying drawings.

It goes without saying that the features mentioned above and those still to be explained below can be used not only in the respectively indicated combinations but also in other combinations or on their own, without departing from the scope of the present invention.

BRIEF DESCRIPTION OF THE DRAWINGS

The invention is schematically illustrated in the drawings using embodiments and will be described schematically and in detail with reference to the drawings.

DETAILED DESCRIPTION OF THE INVENTION

Figure 1:
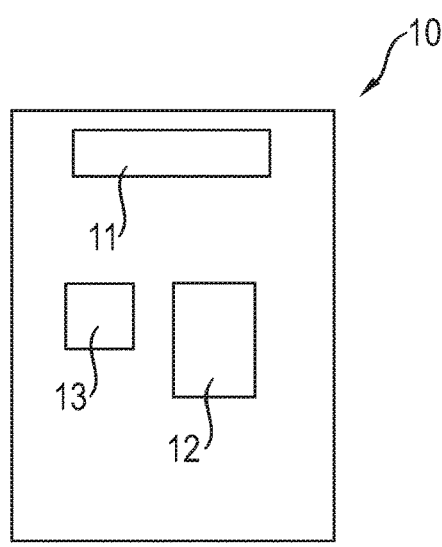
FIG. 1 shows a schematic view of a charging column.

FIG. 1 shows a schematic view of a charging column 10 which can be used within the scope of the method according to aspects of the invention. The charging column 10 has a lighting means 11 which is provided for illuminating the region around the charging column 10. Furthermore, the charging column 10 has a user interface 12 by means of which a user can carry out a charging process on the charging column 10. The user interface 12 may be a display means, for example a touch-sensitive screen. The charging column 10 further has a light sensor 13 for detecting the brightness level prevailing on the charging column 10. The charging column 10 additionally has a charging cable which, however, is not explicitly illustrated in FIG. 1.

Figure 2:
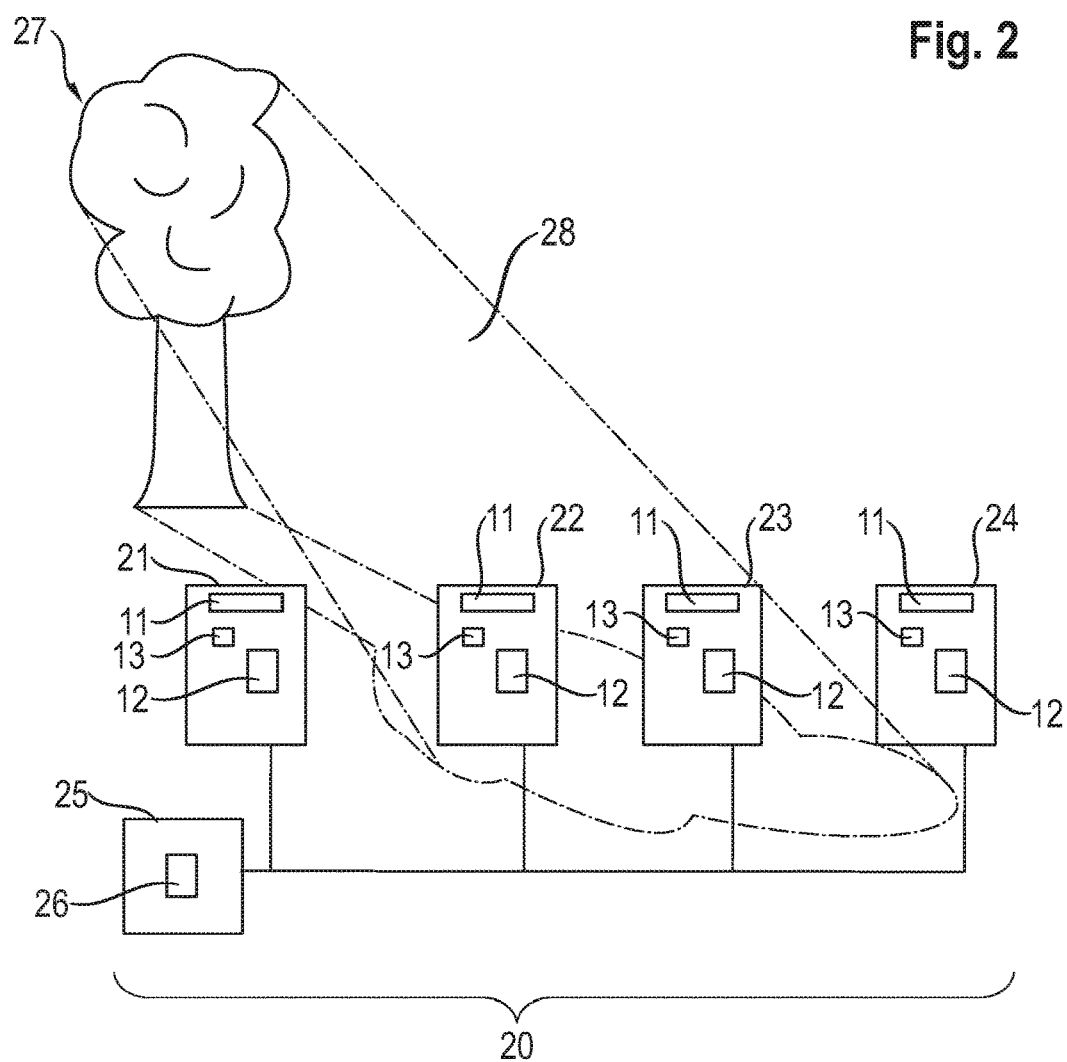
FIG. 2 shows an embodiment of a charging park comprising four charging columns, in which the method according to aspects of the invention is used.

FIG. 2 shows an exemplary charging park 20 which comprises four charging columns 21-24, wherein each of the charging columns 21-24 can correspond to the charging column shown in FIG. 1. The charging columns 21-24 constitute structurally and physically separate units and are all coupled to a charging station 25 which, for example, in addition to the power electronics system (not explicitly illustrated) and optionally a cooling unit, has a central computer unit 26 which is coupled, in particular, to the light sensors 13 of the charging columns 21-24. The computer unit 26 is designed to process the signals/data which are received by the light sensors 13. The computer unit 26 is further coupled to the lighting means 11 and to the displays 12 of the charging columns 21-24 and designed to actuate said lighting means and displays in respect of their brightness depending on a result of collectively evaluating the brightness signals transmitted by the light sensors 13. However, each of the charging columns 21-24 can also additionally have a dedicated control loop for setting the brightness, which control loop functions autonomously provided that it can be assumed that the corresponding light sensor 13 is functioning correctly. In this sense, the computer unit 26 can execute a monitoring function and suspend the autonomous brightness setting of the lighting means 11 and of the display 12 on a charging column 21-24 when the associated light sensor 13 has been identified as defective. In a case of this kind, the control unit 26 can assume the task of controlling the brightness of the lighting means 11 and of the display 12. The monitoring function by the computer unit 26 can take place, for example, by means of, for example, continuous comparison of the reported brightness values with the mean value of said brightness values.

A tree 27, which constitutes an exemplary shading object and casts a shadow 28 over the second charging column 22 and the third charging column 23 during the day, is arranged in the region of the exemplary charging park 20 shown in FIG. 2. If a mean value of the brightness signals of all four light sensors 13 is calculated on a sunny day, the mean value will be relatively high, wherein the brightness values of the sensors 13 of the second and third charging columns 22, 23 will deviate downward therefrom and the brightness values of the sensors 13 of the first and fourth charging columns 21, 24 will deviate upward therefrom. The mean value will be lower on a cloudy day than on a sunny day with a lower standard deviation as expected. At night, the shadow 28 by the tree should not play any role and a relatively low mean value of the ascertained brightness values with a small standard deviation should result.

Defective light sensors 13 can be identified by collectively evaluating the brightness values of the light sensors 13, for example calculating the mean value, and by comparing the mean value with the individual brightness values. If, for example, a brightness signal of a light sensor 13 is permanently at very low values and, in particular, at times at which the mean value is relatively high, it can be assumed that the light sensor 13 is not outputting a signal which is proportional to the ambient light and therefore is defective. The mean value of the brightness values of the other light sensors 13 which originates from the collective evaluation can be used, for example, for setting the brightness of the lighting means 11 and of the display 12 of a charging column 21-24 with a defective light sensor 13. That is to say, the standard brightness of the lighting means 11 and of the display 12 can be changed, for example, proportionally to the decrease (that is to say generally darker surroundings) and increase (that is to say generally brighter surroundings) in the mean value.

If the shading effect of the tree 27 and consequently its effect on the brightness values of the light sensors 13 are not known from experience, the light sensor data can be collectively compared for determining defective light sensors given heavy cloud cover, at night, at dawn before sunrise and/or in the evening after sunset. These times, which are suitable for comparing the light sensors 13, can correspond, for example, to times at which the mean value of the brightness signals of the light sensors 13 is low and preferably has a small standard deviation.

What is claimed is:

1. A method for operating a charging system for charging electric vehicles, wherein the charging system has a charging station and at least two charging columns which are physically separate from one another and each have at least one charging connection, wherein each charging column has a light sensor and also (i) a lighting means and/or (ii) a display means, wherein the method comprises:
    receiving signals from the light sensors, wherein each received signal indicates a brightness value which is ascertained by the corresponding light sensor;
    collectively evaluating the received signals; and
    adjusting the brightness of the lighting means and/or of the display means of at least one of the charging columns depending on a result of collectively evaluating the received signals.

2. The method as claimed in claim 1, wherein collectively evaluating the received signals comprises comparing the received signals with one another.

3. The method as claimed in claim 1, further comprising:
    establishing an incorrectly functioning light sensor on the basis of the result of collectively evaluating the received signals.

4. The method as claimed in claim 1, further comprising:
    sending a servicing request to a service center in an event that the presence of an incorrectly functioning light sensor is established.

5. The method as claimed in claim 1, wherein collectively evaluating the received signals comprises ascertaining a mean value of the received signals.

6. The method as claimed in claim 5, further comprising establishing an incorrectly functioning light sensor on the basis of the result of collectively evaluating the received signals, wherein establishing an incorrectly functioning light sensor is performed when the mean value of the received signals lies below a predetermined threshold value.

7. The method as claimed in claim 6, further comprising the step of:
    using the ascertained mean value as a signal which is transmitted by the incorrectly functioning sensor.

8. The method as claimed in claim 1, further comprising establishing an incorrectly functioning light sensor on the basis of the result of collectively evaluating the received signals, wherein collectively evaluating the received signals comprises ascertaining a deviation in the signal of a determined light sensor from a mean value of the other received signals.

9. The method as claimed in claim 8, further comprising:
    ascertaining a temperature of each charging connection cable of the charging columns; and
    comparing ascertained temperatures of the charging connection cables with ascertained brightness values of the charging columns.

10. The method as claimed in claim 9, further comprising:
controlling a cooling circuit of the charging station depending on a result of the comparison of the ascertained temperatures of the charging connection cables with the ascertained brightness values of the charging columns.

11. A charging system for charging electric vehicles, the charging system comprising:
at least two charging columns which are physically separate from one another and each having at least one charging connection, wherein each charging column has a light sensor, and also (i) a lighting means and/or (ii) a display means, and
a charging station having a control unit which is coupled to the light sensors of the charging columns,
wherein the control unit is configured to:
(i) receive signals from the light sensors, wherein each received signal indicates a brightness value which is ascertained by the corresponding light sensor;
(ii) collectively evaluate the received signals; and
(iii) adjust the brightness of the lighting means and/or of the display means of the charging columns depending on a result of collectively evaluating the received signals.

* * * * *